United States Patent
Dubois et al.

(10) Patent No.: US 8,516,148 B2
(45) Date of Patent: Aug. 20, 2013

(54) METHOD FOR CONTROL MANAGEMENT BASED ON A ROUTING PROTOCOL

(75) Inventors: Nicolas Dubois, Issy les Moulineaux (FR); Benoit Fondeviole, Paris (FR); Bruno Decraene, Vanves (FR)

(73) Assignee: France Telecom, Paris (FR)

( * ) Notice: Subject to any disclaimer, the term of this patent is extended or adjusted under 35 U.S.C. 154(b) by 861 days.

(21) Appl. No.: 11/629,133

(22) PCT Filed: Jun. 10, 2004

(86) PCT No.: PCT/FR2004/001451
§ 371 (c)(1),
(2), (4) Date: Dec. 11, 2006

(87) PCT Pub. No.: WO2006/005816
PCT Pub. Date: Jan. 19, 2006

(65) Prior Publication Data
US 2008/0025333 A1     Jan. 31, 2008

(51) Int. Cl.
*G06F 15/173*      (2006.01)
(52) U.S. Cl.
USPC ............................................ 709/238
(58) Field of Classification Search
USPC ............................. 709/238, 227, 230
See application file for complete search history.

(56) References Cited

U.S. PATENT DOCUMENTS

| | | | | |
|---|---|---|---|---|
| 6,999,454 | B1 * | 2/2006 | Crump | 370/389 |
| 7,130,304 | B1 * | 10/2006 | Aggarwal | 370/389 |
| 7,359,377 | B1 * | 4/2008 | Kompella et al. | 370/389 |
| 7,362,700 | B2 * | 4/2008 | Frick et al. | 370/219 |
| 7,406,030 | B1 * | 7/2008 | Rijsman | 370/216 |
| 7,406,035 | B2 * | 7/2008 | Harvey et al. | 370/218 |
| 7,447,225 | B2 * | 11/2008 | Windisch et al. | 370/428 |
| 7,466,661 | B1 * | 12/2008 | Previdi et al. | 370/254 |
| 7,506,194 | B2 * | 3/2009 | Appanna et al. | 714/3 |
| 7,508,772 | B1 * | 3/2009 | Ward et al. | 370/254 |

FOREIGN PATENT DOCUMENTS

| | | |
|---|---|---|
| EP | 1 414 199 A1 | 4/2004 |
| WO | WO 02/06918 A2 | 1/2002 |

* cited by examiner

*Primary Examiner* — David Y Eng
(74) *Attorney, Agent, or Firm* — Knobbe Martens Olson & Bear LLP

(57) ABSTRACT

A packet transmission network, a plurality of routers have sessions among them based on a routing protocol to exchange routing and/or connectivity data indicating paths for transmitting packets over the network. Each router maintains a first routing table including data sent to another of said routers, and a second routing table including data received from another of said routers. To close at least part of the sessions of a given router, the method consists: in listing the data corresponding to the part of the sessions and contained in at least one of the first and second routing tables; sending an updating message based on the protocol indicating to neighboring routers that the paths indicated in the data are considered out-of-service; then closing the part of the sessions. The router continues transmitting packets emitted on the paths considered out-of-service until the closing step.

7 Claims, 2 Drawing Sheets

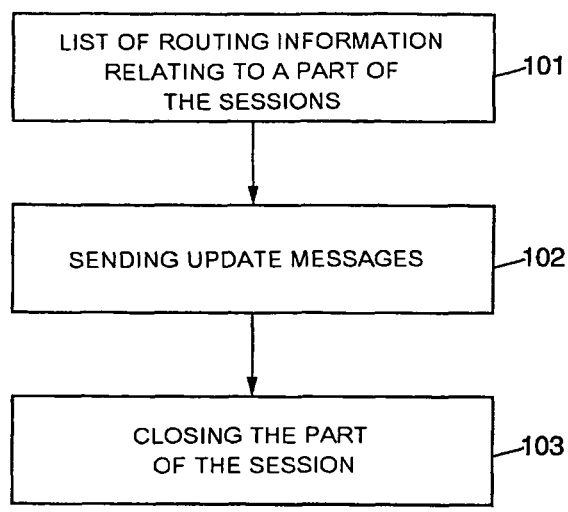
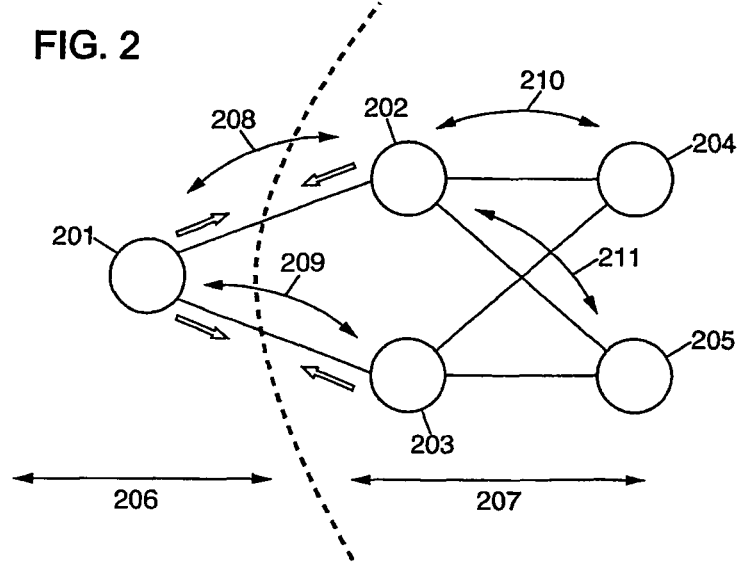

METHOD FOR CONTROL MANAGEMENT BASED ON A ROUTING PROTOCOL

This application claims priority from PCT/FR2004/01451, filed Jun. 10, 2004 which is hereby incorporated by reference in its entirety.

The present invention relates to the field of telecommunications, and more particularly to routing protocols and network elements implementing such protocols.

BACKGROUND OF THE INVENTION

A conventional telecommunication network comprises network elements, called routers, the function of which is to optimize the transmission of the packets. In practice, a packet can generally be transmitted from one element to another element in the network via a number of paths. The routers are used to optimize the transmission of packets by using determined criteria to select the best transmission path out of the possible transmission paths. A router selects such a transmission path based on information normally received according to a routing protocol and stored in routing tables. A routing protocol is a protocol that provides mechanisms enabling a router to construct a routing table and to share routing information with other adjacent routers, in other words, routers with which it maintains a session according to the routing protocol. There are a number of types of routing protocols that use different methods to help the router to collect routing information.

A routing protocol named BGP (Border Gateway Protocol), very widely used in the networks, in particular Internet networks, is known. The routers that implement the BGP protocol are normally deployed redundantly. Thus, the routing information transported in the BGP-type protocol can often be accessed from several points in the network.

When a router is switched off, the traffic passing through that router is rerouted to another network element. This rerouting operation is also called "routing protocol convergence".

During a routing protocol convergence, packets are likely to be lost. In practice, because the convergence of the routers is not instantaneous, switching off a router causes the packets that are still being routed via the router that has been switched off and is therefore out of service to be lost.

Techniques are known for attempting to improve this situation. Thus, a technique called "Graceful Restart BGP" attempts to reduce the packet losses during the BGP routing protocol convergence of a router.

This technique is based on a router architecture comprising a control plane and a transfer plane. Thus, while the control plane of a router is not in operation, for maintenance for example, packets passing through the router are still transferred according to the routing information that is already known. This technique is well suited to maintenance of the control plane of a router.

However, this technique does not allow all maintenance cases to be covered. In practice, since this technique is based on the operation of the transfer plane, when the transfer plane is not in operation, packets can, despite everything, be lost. Furthermore, implementing such a technique requires the operation of the routing protocol to be modified, and it is therefore relatively complicated.

Thus, there is an interest in reducing the loss of packets when a router is switched off by a method that is simple to implement and that covers most maintenance cases.

The present invention aims to propose a solution tending to satisfy these requirements.

SUMMARY OF THE INVENTION

A first aspect of the invention proposes a session control method according to a routing protocol in a packet transmission network comprising a plurality of routers having sessions between them according to said protocol for exchanging routing and/or connectivity information indicating paths for transmitting packets over the network, wherein each of said routers maintains a first routing table containing information sent to another of said routers via said protocol, and a second routing table containing information received from another of said routers via said protocol, said method comprising the following steps for closing at least a part of the sessions of a given router:

listing the information corresponding to said part of the sessions and contained in at least one of the first and second routing tables;

sending an update message according to said protocol indicating to adjacent routers that the paths indicated in said information are considered to be out of service;

closing said part of the sessions;

and wherein said router continues to transmit packets sent over said paths considered to be out of service until the closure step.

A second aspect of the invention proposes a method of maintaining a router in a packet transmission network comprising a plurality of routers having sessions between them according to a routing protocol for exchanging routing and/or connectivity information indicating paths for transmitting packets over the network, wherein each of said routers maintains a first routing table containing information sent to another of said routers via said protocol, and a second routing table containing information received from another of said routers via said protocol, said method comprising the following steps, for a given router:

initiating maintenance corresponding to a given part of the sessions of the router;

closing said part of the sessions of the router, according to a method according to the above method;

performing said maintenance.

A third aspect of the invention proposes a session management system comprising means arranged to implement one of the above methods.

A fourth aspect of the invention proposes a router comprising means arranged to operate in the above system.

It will be noted that the terms "paths considered to be out of service" indicated by a router given in an update message refers to the paths that are considered to be out of service by the adjacent routers, but that are not yet actually out of service. In practice, until the closure step, the packets continue to be routed via these paths.

Thanks to these arrangements, the loss of packets during a routing protocol convergence can be reduced. In practice, when there is a desire to stop all or a part of the messages of a router, the adjacent routers are informed of the changes of routing information via the routing protocol. Consequently, on receiving this information, the adjacent routers can update their routing tables and the convergence of the routing protocol is thus accelerated. The number of packets lost can then be reduced.

In a preferred embodiment, the part of the sessions is closed when a determined criterion is satisfied. The result is a better control of the reduction of the loss of packets during a protocol convergence. It is thus possible to close the part of the sessions when it is detected that the number of packets passing over the paths indicated as out of service is substantially zero. Or even, the part of the sessions can be closed on expiry of a timer.

In a preferred embodiment, when all the sessions of a router are closed, only the information contained in the first routing table is listed then sent to adjacent routers.

Other aspects, aims and advantages of the invention will become apparent from reading the description of one of its embodiments.

BRIEF DESCRIPTION OF THE DRAWINGS

The invention will also be better understood by means of the drawings, in which:

FIG. 1 illustrates a routing protocol session management method according to an embodiment of the invention;

FIG. 2 is a diagram of a network architecture according to an embodiment of the invention;

DESCRIPTION OF PREFERRED EMBODIMENTS

Figure 3:
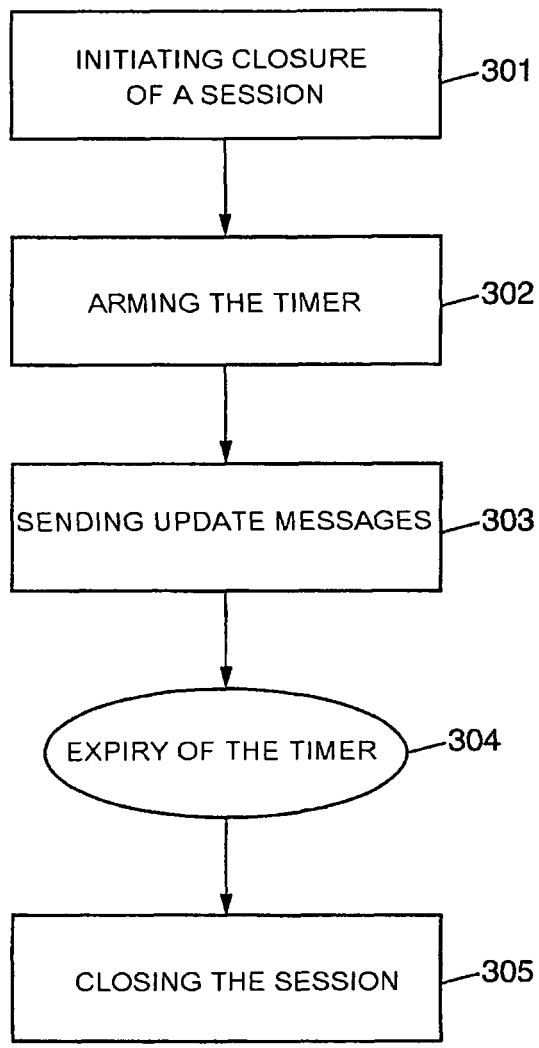
FIG. 3 illustrates a session management method with timer according to an embodiment of the invention.

Some telecommunication networks operating under a single technical administration are unified networks. Others, however, normally substantially larger ones, are split up into a plurality of "subnetworks", each operating under its own technical administration, called "standalone systems". A standalone system is a set of routers operating under a single technical administration, using an internal routing protocol and common routing information for routing the packets within the standalone system. Such routers moreover use an external routing protocol to route the packets to the other standalone systems. Certain routing protocols are suitable for use advantageously as internal routing protocol and external routing protocol. Such is the case with the BGP-type routing protocols. A BGP-type routing protocol makes it possible in practice to have sessions between routers of a network so as to ensure the consistency of the routing tables on all the elements within a given administrative domain and over all the administrative domains of a network.

A routing protocol derived from the BGP protocol is named MP-BGP, standing for Multi-Protocol BGP. It provides the standalone systems with the possibility of swapping extensive information that the BGP protocol on its own does not manage. This variant of the protocol is used to support certain technologies like MPLS-VPN (Multi-Protocol Label Switching Virtual Private Network), or even Multicast. There are yet other variants of the BGP protocol, like, for example, e-BGP used between routers belonging to different standalone systems, i-BGP used between routers belonging to the same standalone system, or even MP-BGP used for transporting IPv6, Multicast or MPLS VPN addresses.

The present invention applies to all the networks based on such protocols.

The present invention can be implemented in unified networks as well as in networks comprising a number of administrative domains. It can be applied to networks interconnected to an Internet-type network, or even to networks used for private purposes.

The invention covers a configuration in which all the routers of the network advantageously implement a method according to an embodiment of the invention. However, a configuration wherein one of the routers or only some of the routers of the network implements an embodiment of the invention is already proving to be very advantageous.

An embodiment of the invention is based on a BGP-type routing protocol.

In an embodiment of the invention, a router maintains routing tables containing routing and connectivity information exchanged with adjacent routers via the routing protocol.

The terms "adjacent router" of a given router refers to a router having a session based on the routing protocol of the network with the given router.

Such a routing protocol specifies the following messages:
a session opening message, denoted "OPEN";
a routing and/or connectivity information update message; denoted "UPDATE"; some of these messages can be used to add routing information to the routing tables, others among these messages can be used to remove routing information, the latter being hereinafter called removal update messages;
a message notifying different session states, denoted "NOTIFICATION", the latter message being used in particular to close a session.

The routing protocol according to an embodiment of the invention makes it possible to transport a number of address types, such as, for example, in an IP network, IP Version 4, IP Version 6 addresses, or Multicast type addresses or even MPLS-VPN-type addresses.

A router according to an embodiment of the invention maintains a first routing table containing routing and/or connectivity information sent to one or more adjacent routers and a second routing table containing routing and/or connectivity information received from one or more adjacent routers, via the network routing protocol. Such tables are respectively named hereinafter "output table" and "input table".

The invention also covers a configuration in which a router maintains an input table and an output table for each of the routing protocol sessions that it maintains. However, in the interests of clarity, a router manages only one input table and one output table below. The routing and/or connectivity information contained in these tables enables the router to determine packet transmission paths.

In an embodiment of the invention, when a router has one or more sessions according to the routing protocol, all or a part of these sessions can be closed with fewer packets lost.

In practice, in a first case, a part of a given session of the router can be closed, for example corresponding to a family of addresses of the session. Thus, the router scans its output table and lists the routing and/or connectivity information corresponding to the part of the session. Next, it scans its input table and lists the routing and/or connectivity information corresponding to the part of the session. Then, it sends a removal update message containing the duly listed information to the adjacent routers. Such a message indicates to the routers that they must consider the paths corresponding to the information sent in the removal update message to be out of service.

In a second case, a complete session of the router can be closed. Thus, the router scans its output table and lists the routing and/or connectivity information corresponding to the session. Next, it scans its input table and lists the routing and/or connectivity information corresponding to the session. Then, it sends a removal update message containing the duly listed information to the adjacent routers. Such a message indicates to the routers that they must consider the paths corresponding to the information sent in the removal update message to be out of service.

In a third case, a group of sessions of the router can be closed. Thus, the router scans its output table and lists the routing and/or connectivity information corresponding to the group of sessions. Next, it scans its input table and lists the routing and/or connectivity information corresponding to the group of sessions. Then, it sends a removal update message containing the duly listed information to the adjacent routers. Such a message indicates to the routers that they must consider the paths corresponding to the information sent in the removal update message to be out of service.

In a fourth case, it is also possible to close all the sessions of the router. This operation is simpler than the preceding ones. In practice, in this case, only the output table is preferably scanned. The routing and/or connectivity information corresponding to all the sessions is listed then sent to the adjacent routers. Such a message indicates to the routers that they must consider the paths corresponding to the information sent in the removal update message to be out of service.

Between the moment when the removal update message is sent and the moment when the routers receiving the message process the information received and, because of this, cease to transmit packets over the paths considered to be out of service, that is during the rerouting convergence time, the router continues to transmit the packets received over the paths considered to be out of service.

Then, when a determined criterion is satisfied, in the first case the part of the sessions is closed, in the second case the complete session is closed, in the third case, the group of sessions is closed and finally, in the fourth case, all the sessions are closed.

FIG. 1. illustrates the main steps of a session control method according to an embodiment of the invention. In a first step 101, the routing information concerning a part of the sessions is listed. In a second step 102, a removal update message is sent containing the information previously listed. And, in a third step 103, the part of the sessions of the router is closed.

Preferably, a part of a session, a complete session, a group of sessions or even all the sessions of a router are closed via the sending of a corresponding "NOTIFICATION" message.

FIG. 2 illustrates a router network architecture in an embodiment of the present invention. The router network comprises two administrative domains 206 and 207. A router 202 has a session 210 in the same administrative domain with a router 204 and a session 211 with a router 205. The router 202 also has a session 208 with a router 201 of the administrative domain 206. Then the router 201 has a session 209 with a router 203.

There is a desire to switch off the router 202, to perform an overall maintenance operation for example, and, because of this, to close all the sessions of the router 202. Abruptly switching off the router 202 would result in the loss of packets transmitted to this router during the routing protocol convergence time.

In an embodiment of the invention, when the router 202 is informed of a closure of all its sessions according to the routing protocol, it scans its output table. It selects routing and connectivity information corresponding to all the sessions that it has, that is, the sessions 208, 210 and 211. Then, it sends removal update messages according to the routing protocol to the adjacent routers referenced 201, 204 and 205, that is, to the routers with which it has a session according to the routing protocol. Such removal update messages contain the duly selected routing and/or connectivity information.

Then, preferably, after having informed the adjacent routers that they must consider the routing and/or connectivity information contained in the removal update messages to be out of service, the router 202 checks to see if the determined criterion is satisfied.

On receiving such removal update messages, the routers 201, 204 and 205 update their respective routing tables and, because of this, reroute the packets initially routed to the router 202, to other routers. Thus, for example, the router 201 reroutes packets initially routed to the router 202 to the router 203.

When the router 202 detects that the determined criterion is satisfied, it closes all these sessions. A number of determined criteria are detailed below.

The router can use a determined criterion corresponding to a substantially zero number of packets sent over the paths considered to be out of service. In this case, the part of the sessions or all the sessions are closed only when it is detected that the number of packets sent over the paths considered to be out of service is substantially zero.

It is also possible to use a determined criterion corresponding to the expiry of a timer. In this case, it is estimated that the number of packets sent passing over the paths considered to be out of service is substantially zero by assuming that, after a certain time, no more packets will be passing over the paths corresponding to the routing and/or connectivity information sent in the removal update messages. This time preferably corresponds substantially to a latency time introduced by the time to transmit removal update messages from the router 202 to the adjacent routers 201, 204 and 205, and by the processing time of these messages by the adjacent routers.

Thus, in this case, preferably, the router 202 manages a timer. When this timer expires, the router estimates that there is no more traffic detected on the corresponding paths, and that therefore the number of packets to be routed is substantially zero.

Such a timer can be armed before removal update messages are sent. It can also be armed after removal update messages are sent.

Furthermore, a router can manage an overall timer duration for all the router. It can also manage a timer duration corresponding to a group of sessions. It can manage a timer duration corresponding to a complete session or even a timer duration corresponding to a part of the sessions.

The present invention covers all other methods that can be used to estimate that the number of packets transmitted to the router over the paths considered to be out of service is substantially zero.

In an embodiment of the invention, a partial or total maintenance of a router is initiated. The router informed of a partial or total maintenance closes the part of the sessions corresponding to the partial maintenance initiated, or even to the total maintenance, according to a session management method according to an embodiment of the invention. A partial maintenance may correspond to the closure of a part of a session, a complete session or even a group of complete sessions, and a total maintenance corresponds to the closure of all the sessions.

FIG. 3 illustrates a method of managing the closure of a complete routing protocol session according to an embodiment of the invention, wherein the router uses the expiry of a timer to estimate that the traffic passing over the paths considered to be out of service is zero.

A router configuration and management system normally makes it possible to indicate to the router that a maintenance of a complete session, for example, is to be carried out. Duly informed, the router initiates a session closure in a step 301. In a step 302, the router arms a timer. In a step 303, the router sends removal update messages to the adjacent routers, containing routing and/or connectivity information corresponding to the session. The expiry of the timer in the step 304 triggers the closure of the session by the router in a step 305.

In an embodiment of the present invention, the router configuration and management system preferably makes it possible to enter a command that involves stopping all or part of the sessions of the router. Such a system can also be used to configure a value for the timer as defined previously. Interesting results are obtained in particular with a timer with a value of 300 seconds.

Furthermore, preferably, the router offers two methods of managing a closure of all or part of the sessions. In a first method, it closes all or part of the sessions in such a way that the loss of packets is reduced, as has been described previously. In a second method, it closes all or part of the sessions more abruptly, as in the session closure management methods already known. The configuration system configures the management method that it wants the router to apply.

The invention therefore makes it possible to reduce the loss of traffic at the time of scheduled maintenance on a router implementing a BGP-type routing protocol. It can be implemented on one or several routers of the network since a router according to an embodiment of the invention can operate with a router not implementing a management method according to the invention. In practice, the messages defined by the network routing protocol are preferably unmodified.

In an embodiment of the present invention, only the sequence of the messages sent on management of a closure of a part of a session, of a complete session, of a group of sessions or even of all the sessions of a router is advantageously modified, the management protocol messages not being modified. Thus, an embodiment of the present invention is easy to implement in existing router networks.

The invention claimed is:

1. A session control method according to a routing protocol of the Border Gateway Protocol (BGP) type in a packet transmission network comprising a plurality of routers having a plurality of sessions between them according to said protocol for exchanging routing and/or connectivity information corresponding to paths for transmitting packets over the network, wherein each of said routers maintains an output table containing routing and/or connectivity information sent to another of said routers via said protocol, and an input table containing routing and/or connectivity information received from another of said routers via said protocol, said method comprising the following steps for closing a subset of the plurality of sessions associated with a given router:

listing the routing and/or connectivity information exchanged by means of said subset of the plurality of sessions and contained in at least one of the input and output tables of the given router;

sending an update message according to said protocol to routers adjacent to the given router, a router adjacent to a given router being a router having a session based on the routing protocol with the given router, said update message comprising routing and/or connectivity information obtained at the previous step, said update message indicating routing and/or connectivity information to be removed from tables for indicating that the paths for transmitting packets corresponding to said listed routing and/or connectivity information are considered as out of service; and closing said subset of the plurality of sessions, the closing the said subset of the plurality of sessions occurring when a determined criterion is satisfied, wherein said given router continues to transmit packets sent over said paths considered as out of service until the closing of said subset of the plurality of sessions, said method further comprising the following steps, at a router adjacent to the given router:

receiving the update message, processing the information included in the update message, and ceasing to transmit packets over the paths to be considered as out of service.

2. The method as claimed in claim 1, wherein the determined criterion is a detection of a substantially zero number of packets sent over a path indicated in the update message as being a path considered to be out of service.

3. The method as claimed in claim 1, wherein the determined criterion is the expiry of a timer armed before or after the step of sending an update message.

4. The method as claimed in any one of the preceding claims, wherein the plurality of sessions associated with the given router is defined by a given family of addresses.

5. The method as claimed in claim 1 comprising, before the step of listing, the following step:

initiating maintenance corresponding to a given part of the sessions of the router; and after the step of listing, the following step:

performing said maintenance.

6. A router based on a routing protocol of the Border Gateway Protocol (BGP) type in a packet transmission network comprising a plurality of routers having a plurality of sessions between them according to said protocol for exchanging routing and/or connectivity information corresponding to paths for transmitting packets over the network, said router comprising:

means for maintaining an output table containing routing and/or connectivity information sent to another of said routers via said protocol, and an input table containing routing and/or connectivity information received from another of said routers via said protocol;

means adapted for listing routing and/or connectivity information exchanged by means of a subset of the plurality of sessions and contained in at least one of the input and output routing tables;

means adapted for sending an update message according to said protocol to routers adjacent to the said router, a router adjacent to the said router being a router having a session based on the routing protocol with the said router, said update message comprising routing and/or connectivity information, said update message, for indicating routing and/or connectivity information to be removed from tables for indicating that the paths for transmitting packets corresponding to said listed routing and/or connectivity information are considered as out of service;

means for closing said subset of the plurality of sessions, the closing of the said subset of the plurality of sessions occurring when a determined criterion is satisfied; and transmission means adapted for continuing to transmit packets sent over said paths considered as out of service until said closure means close said part of the sessions, a router adjacent to the said router being configured to receive the update message, to process the information included in the update message, and to cease to transmit packets over the path to be considered as out of service.

7. A session management system based on a routing protocol in a packet transmission network, said management system comprising a plurality of routers as claimed in claim 6.

* * * * *